United States Patent
Cheng

(10) Patent No.: US 6,744,481 B2
(45) Date of Patent: Jun. 1, 2004

(54) LCD HAVING DISPLAY CAPABILITY ON BOTH SIDES

(75) Inventor: Yung-Fa Cheng, Taipei (TW)

(73) Assignee: Quanta Computer Inc., Taoyuan (TW)

( * ) Notice: Subject to any disclaimer, the term of this patent is extended or adjusted under 35 U.S.C. 154(b) by 26 days.

(21) Appl. No.: 10/100,674

(22) Filed: Mar. 18, 2002

(65) Prior Publication Data

US 2002/0130996 A1 Sep. 19, 2002

(30) Foreign Application Priority Data

Mar. 19, 2001 (TW) .................................. 90204104 U

(51) Int. Cl.$^7$ .............................................. G02F 1/1335
(52) U.S. Cl. ........................................ 349/113; 455/566
(58) Field of Search .................... 349/113, 16; 455/566; 345/684; 353/20

(56) References Cited

U.S. PATENT DOCUMENTS

| | | |
|---|---|---|
| 5,805,252 A | 9/1998 | Shimada et al. |
| 5,889,570 A | 3/1999 | Mitsui et al. |
| 6,466,292 B1 * | 10/2002 | Kim ........................... 349/143 |
| 6,574,487 B1 * | 6/2003 | Smith et al. ................ 455/566 |

* cited by examiner

Primary Examiner—Tarifur R. Choudhury
Assistant Examiner—David Y. Chung
(74) Attorney, Agent, or Firm—Merchant & Gould P.C.

(57) ABSTRACT

A liquid crystal display panel (LCD) having display capability on both sides. The LCD comprises a liquid crystal module, a first front polarizer, a first rear polarizer, a first reflector, a second front polarizer, a second rear polarizer, and a second reflector. By replacing a portion of the original front polarizer with the first rear polarizer and the first reflector, and replacing a portion of the original rear polarizer and the original reflector with the first front polarizer, the LCD having display capability on both sides can be attained.

4 Claims, 6 Drawing Sheets

LCD HAVING DISPLAY CAPABILITY ON BOTH SIDES

BACKGROUND OF THE INVENTION

1. Field of the Invention

The invention relates to a liquid crystal display panel; in particular, to a liquid crystal display panel having display capability on both sides.

2. Description of the Related Art

Notebook computer manufacturers use a variety of liquid crystal display (LCD) panel types in the manufacture of notebook computers to reduce cost and to increase production levels. Recently, there is also a growing need for mobile is communication devices using the LCD panels. For example, the LCD panels can be applied in mobile phones and personal digital assistant (PDA) devices.

A conventional LCD panel 10 is shown in FIG. 1a, FIG. 1b and FIG. 1c. Numeral 11 represents a liquid crystal module. The liquid crystal module 11 comprises a substrate, liquid crystal molecules and other material. However, since the detail structure of the liquid crystal module 11 is irrelative to the characteristic of this invention and is well known by persons skilled in the art, their detail description is omitted.

The liquid crystal display module 11 is provided with a front polarizer 12 at one side and a rear polarizer 13 at the other side. Generally, the polarized axis of the front polarizer 12 and the polarized axis of the front polarizer 13 are perpendicular, and the alignment of the liquid crystal molecules in the liquid crystal module 11 is well controlled. Specifically, light passes through the polarizer 12, 13 by the arrangement of the polarizer 12, 13 and the alignment of the liquid crystal molecules in the liquid crystal module 11. As a result, depending on whether the light passes through or not, different images are shown on the LCD panel 10.

The rear polarizer 13 is provided with a reflector 14. By means of the reflector 14, characters and graphs can be shown on the front polarizer 12. That is, viewing from a direction by an arrow A of FIG. 1b, characters shown in FIG. 1c can be seen on the LCD panel 10.

Furthermore, there is a need for mobile communication devices with an LCD panel having display capability on both sides.

For example, a PDA mobile phone 30 is shown in FIG. 2a and FIG. 2b. The PDA mobile phone is a communication device with PDA function and mobile phone function. When a keyboard portion 31 and a display portion 32 combine, a first screen 33 of the display portion 32 is used as a screen for the mobile phone function. When a keyboard portion 31 and a display portion 32 separate, a second screen 34 of the display portion 32 is used as a screen for the PDA function.

However, in the conventional PDA mobile phone, two LCD panels are used as the first screen and the second screen respectively. Thus, the cost is increased, and the whole thickness is also increased. As a result, it is difficult to miniaturize the PDA mobile phone.

SUMMARY OF THE INVENTION

In order to address the disadvantages of the aforementioned LCD panel, the invention provides an LCD panel having display capability on both sides.

Another purpose of this invention is to minimize the thickness of a PDA mobile phone.

Accordingly, the invention provides a liquid crystal display panel. The LCD panel comprises a liquid crystal module, a first polarizer, a second polarizer, a first reflector, and a second reflector. The liquid crystal module is provided with a first surface and a second surface opposite to the first surface. The first polarizer is disposed on the first surface of the liquid crystal module, and the second polarizer is disposed on the second surface of the liquid crystal module. The first reflector is disposed on part of the first polarizer, and the second reflector is disposed on part of the second polarizer. The other part of the second polarizer and the first reflector overlap completely in a direction perpendicular to the first surface of the liquid crystal module.

Furthermore, the liquid crystal module comprises a substrate, and liquid crystal molecules.

In another preferred embodiment, this invention provides another liquid crystal display panel. The LCD panel comprises a liquid crystal module, a first front polarizer, a first rear polarizer, a first reflector, a second rear polarizer, a second front polarizer, and a second reflector. The liquid crystal module is provided with a first surface and a second surface opposite to the first surface, and the first front polarizer is disposed on one portion of the first surface of the liquid crystal module. The first rear polarizer is disposed on the second surface of the liquid crystal module. The first front polarizer and the first rear polarizer overlap completely in a direction perpendicular to the first surface of the liquid crystal module. The first reflector is disposed on the first rear polarizer, and the second rear polarizer is disposed on the other portion of the first surface of the liquid crystal module. The second front polarizer is disposed on the second surface of the liquid crystal module. The second front polarizer and the second rear polarizer overlap completely in a direction perpendicular to the first surface of the liquid crystal module. The second reflector is disposed on the second rear polarizer.

In another preferred embodiment, this invention provides another adapted for a PDA mobile phone having a first screen and a second screen. The LCD panel comprises a liquid crystal module, a first polarizer, a second polarizer, a first reflector, and a second reflector. The liquid crystal module is provided with a first surface and a second surface opposite to the first surface. The first polarizer is disposed on the first surface of the liquid crystal module, and the second polarizer is disposed on the second surface of the liquid crystal module. The first reflector is disposed on one portion of the first polarizer, and the second reflector is disposed on one portion of the second polarizer. The other portion of the second polarizer and the first reflector overlap completely in a direction perpendicular to the first surface of the liquid crystal module. The other portion of the first polarizer is used as the first screen, and the other portion of the second polarizer is used as the second screen.

In another preferred embodiment, this invention provides another adapted for a PDA mobile phone having a first screen and a second screen. The LCD panel comprises a liquid crystal module, a first front polarizer, a first rear polarizer, a first reflector, a second rear polarizer, a second front polarizer, and a second reflector. The liquid crystal module is provided with a first surface and a second surface opposite to the first surface. The first front polarizer is disposed on one portion of the first surface of the liquid crystal module and used as the first screen. The first rear polarizer is disposed on the second surface of the liquid crystal module. The first front polarizer and the first rear polarizer overlap completely in a direction perpendicular to the first surface of the liquid crystal module. The first reflector is disposed on the first rear polarizer, and the second rear polarizer is disposed on the other portion of the first surface of the liquid crystal module. The second front polarizer is disposed on the second surface of the liquid crystal module and used as the second screen. The second front polarizer and the second rear polarizer overlap completely in a direction perpendicular to the first surface of the liquid crystal module. The second reflector is disposed on the second rear polarizer.

BRIEF DESCRIPTION OF THE DRAWINGS

The invention is hereinafter described in detail with reference to the accompanying drawings in which:

FIG. 1a is a schematic view depicting a conventional LCD panel;

FIG. 1b is an enlarged view depicting a part D of FIG. 1a;

FIG. 3b is an enlarged view depicting a part E of FIG. 3a;

FIG. 4b is an enlarged view depicting a part F of FIG. 4a.

DETAILED DESCRIPTION OF THE INVENTION

First Embodiment

Figures 1A, 1B:
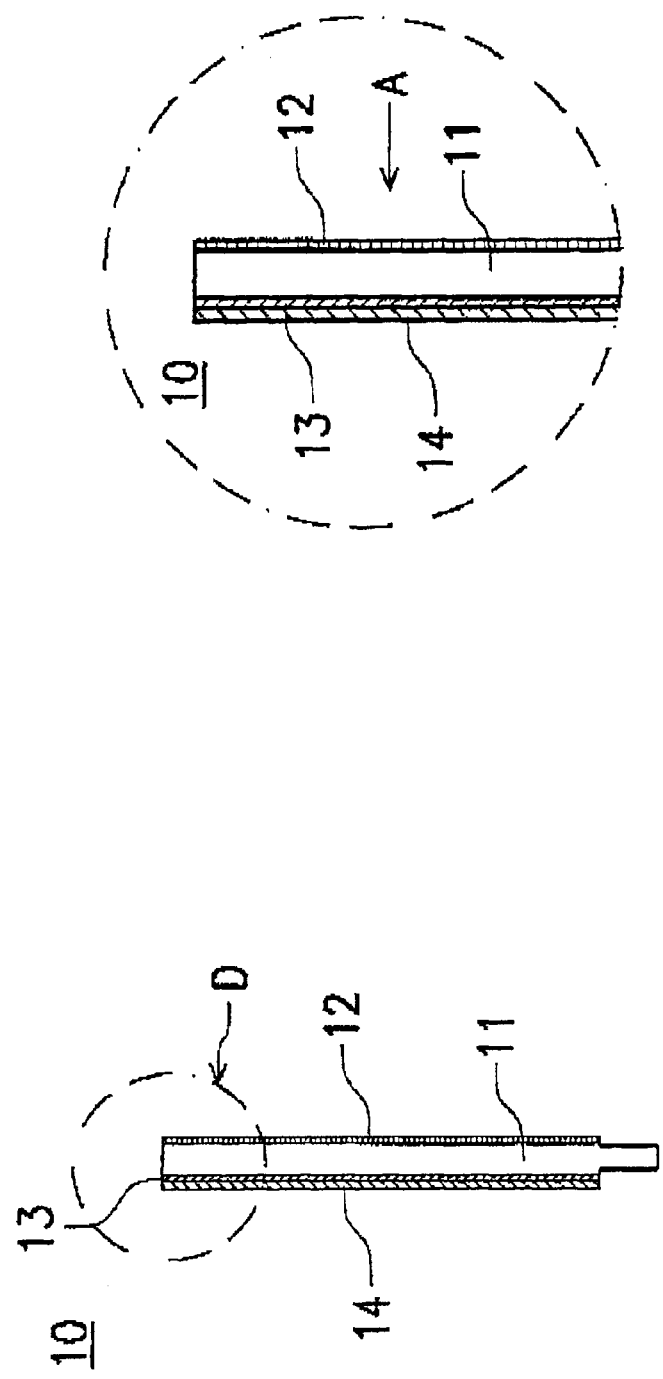
Figure 1C:
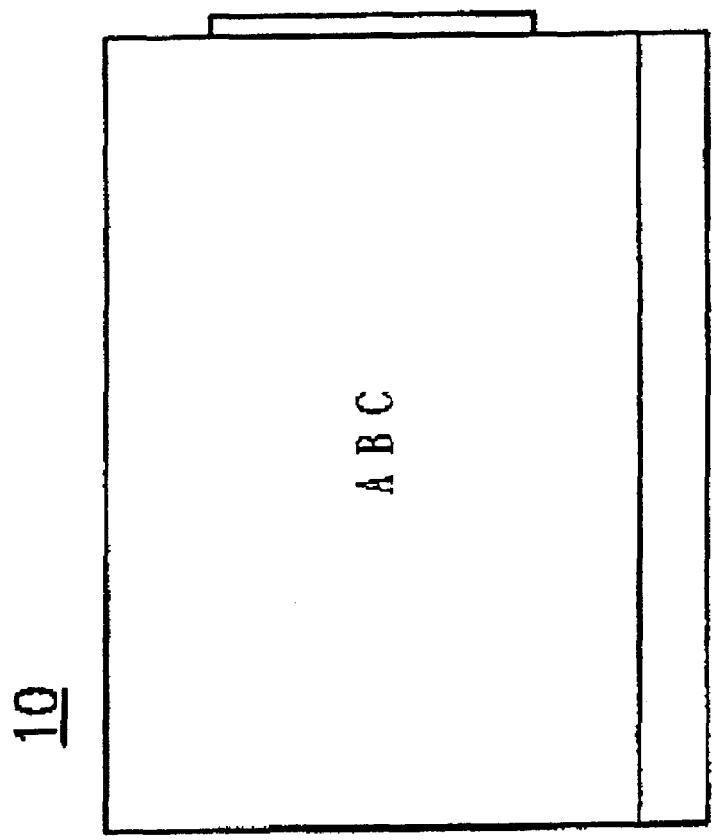
FIG. 1c is a side diagram viewing from an arrow A of FIG. 1b.

Referring to FIG. 3a, FIG. 3b, FIG. 3c and FIG. 3d, a liquid crystal display panel 20, as disclosed in a first embodiment of this invention, comprises a liquid crystal module 21, a first polarizer 22, a second polarizer 23, a first reflector 24, and a second reflector 25. Like the conventional device, the liquid crystal module 21 comprises a substrate, liquid crystal molecules and other material, and is provided with a first surface 211 and a second surface 212 opposite to the first surface 211.

The first polarizer 22 is disposed on the first surface 211 of the liquid crystal module 21, and the second polarizer 23 is disposed on the second surface 212 of the liquid crystal module 21. The first reflector 24 is disposed on part of the first polarizer 22, and the second reflector 25 is disposed on part of the second polarizer 23. The first reflector 24 and the second reflector 25 do not overlap in a direction perpendicular to the first surface 211 of the liquid crystal module 21. In other words, the liquid crystal module 21 is divided into an upper portion and a lower portion by a dash line X. The first reflector 24 is disposed on the upper portion of one side of the liquid crystal module 21, and the second reflector 25 is disposed on the lower portion of the other side of the liquid crystal module 21.

Since the second reflector 25 is disposed on the second polarizer 23, characters can be shown on part, without disposing the first reflector 24, of the first polarizer 22. That is, viewing from a direction by an arrow B of FIG. 3b, characters shown in FIG. 3c can be seen on the LCD panel 20. As well, since the first reflector 24 is disposed on the first polarizer 22, characters can be shown on part, without disposing the second reflector 25, of the second polarizer 23. That is, viewing from a direction by an arrow C of FIG. 3b, characters shown in FIG. 3d can be seen on the LCD panel 20.

Thus, by means of one LCD panel, characters can be shown on both the upper portion of one side and the lower portion of the other side. As a result, the cost is reduced, and the whole weight and thickness of product using the LCD panel is also reduced.

Figures 2A, 2B:
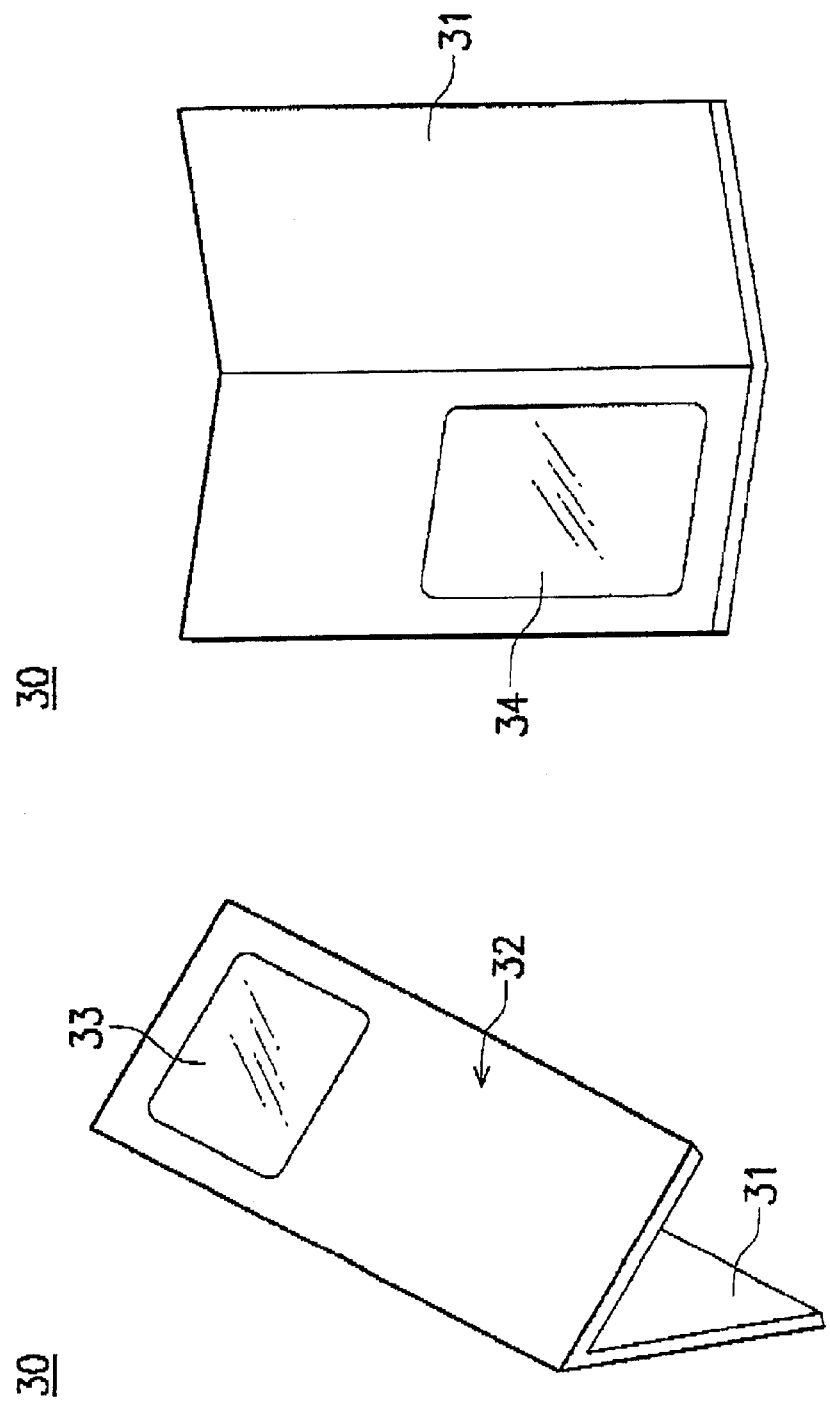
FIG. 2a and FIG. 2b are schematic views depicting a PDA mobile phone.

When the LCD panel in this embodiment is applied in the PDA mobile phone as shown in FIG. 2a, part, without disposing the second reflector 25, of the second polarizer 23 can be used as the first screen for mobile phone function, and part, without disposing the first reflector 24, of the first polarizer 22 can be used as the second screen for PDA function.

Figure 3B:
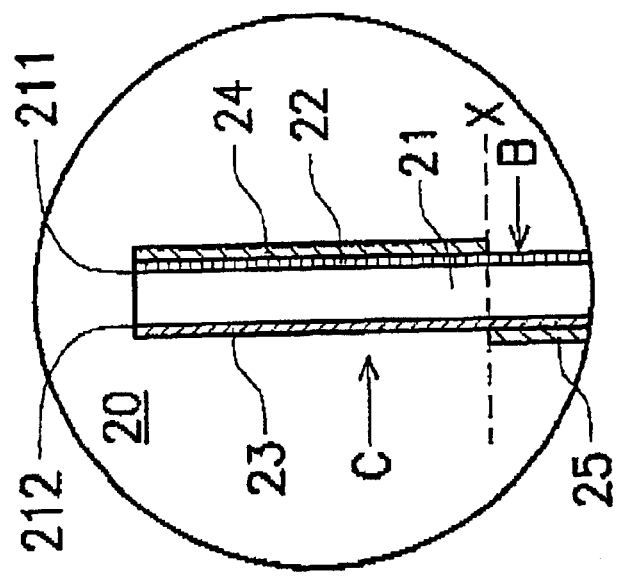
Figure 3A:
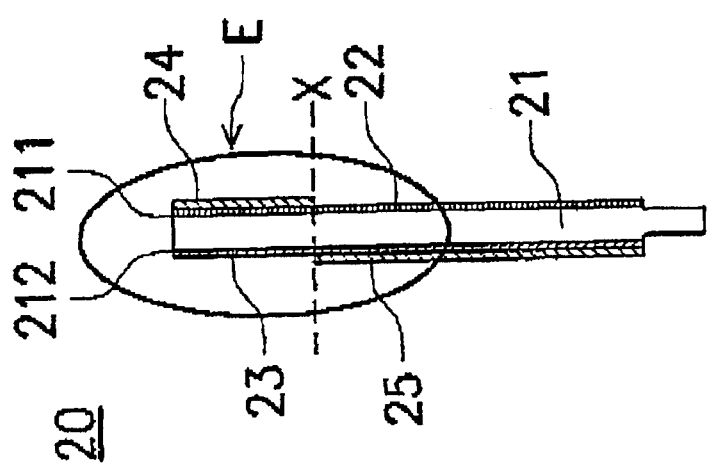
FIG. 3a is a schematic view depicting an LCD panel of a first embodiment as disclosed in this invention.
Figure 3D:
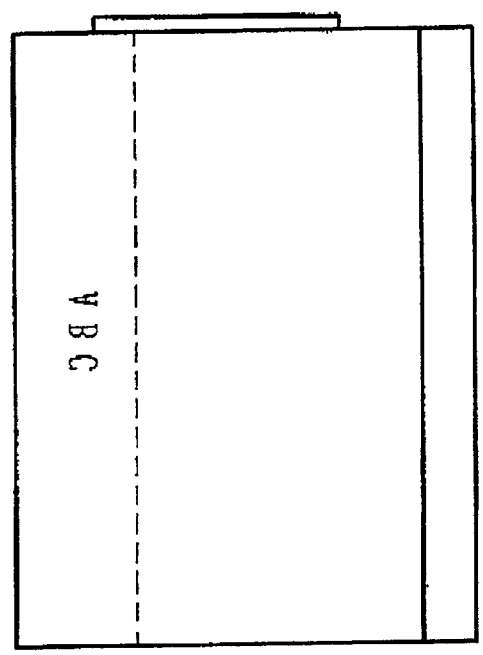
FIG. 3d is a side diagram viewing from an arrow C of FIG. 3b and FIG. 4b.
Figure 3C:
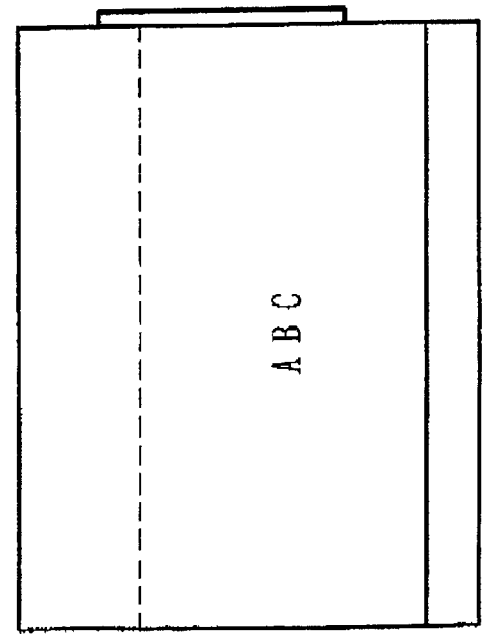
FIG. 3c is a side diagram viewing from an arrow B of FIG. 3b and FIG. 4b.
Figure 4B:
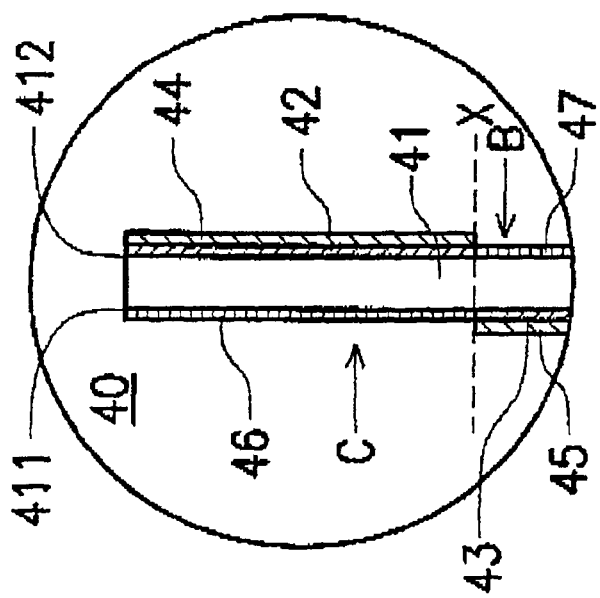
Figure 4A:
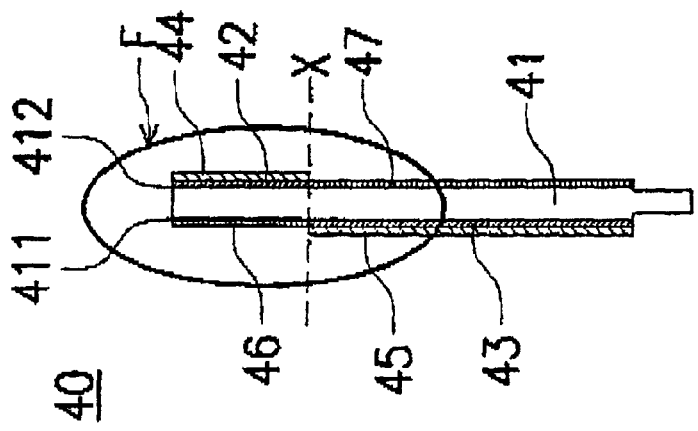
FIG. 4a is a schematic view depicting an LCD panel of a second embodiment as disclosed in this invention.

It is noted that characters, shown on the LCD panel 20 in FIG. 3d, are abnormal; that is, they are mirror images of normal characters. However, they can be changed to normal characters by means of software. Since this method is well known by persons skilled in the art, their description is omitted.

In addition, it is understood that the proportion between the first screen and the second screen of the PDA mobile phone can be changed by adjusting the size of the reflectors 24, 25.

Second Embodiment

Referring to FIG. 4a, FIG. 4b, FIG. 3c and FIG. 3d, a liquid crystal display panel 40, as disclosed in a second embodiment of this invention, comprises a liquid crystal module 41, a first front polarizer 46, a first rear polarizer 42, a first reflector 44, a second rear polarizer 43, a second front polarizer 47, and a second reflector 45. Like the first embodiment, the liquid crystal module 41 comprises a substrate, liquid crystal molecules and other material, and is provided with a first surface 411 and a second surface 412 opposite to the first surface 411.

The liquid crystal module 41 is divided into an upper portion and a lower portion by a dash line X. The first front polarizer 46 is disposed on the upper portion of the first surface 411 of the liquid crystal module 41, and the second rear polarizer 43 is disposed on the lower portion of the first surface 411 of the liquid crystal module 41. The first rear polarizer 42 is disposed on the upper portion of the second surface 412 of the liquid crystal module 41, and the second front polarizer 47 is disposed on the lower portion of the second surface 412 of the liquid crystal module 41. The first reflector 44 is disposed on the first rear polarizer 42, and the second reflector 45 is disposed on the second rear polarizer 43. That is, the first front polarizer 46, the first rear polarizer 42 and the first reflector 44 overlap completely in a direction perpendicular to the first surface 411 of the liquid crystal module 41. As well, the second front polarizer 47, the second rear polarizer 43 and the second reflector 45 overlap completely in a direction perpendicular to the first surface 411 of the liquid crystal module 41.

Since the second reflector 45 is disposed on the second rear polarizer 43, characters can be shown on the second front polarizer 47. That is, viewing from a direction by an arrow B of FIG. 4b, characters shown in FIG. 3c can be seen on the LCD panel 40. As well, since the first reflector 44 is disposed on the first rear polarizer 42, characters can be shown on the first front polarizer 46. That is, viewing from a direction by an arrow C of FIG. 4b, characters shown in FIG. 3d can be seen on the LCD panel 40.

Thus, by means of one LCD panel, characters can be shown on both the upper portion of one side and the lower portion of the other side. As a result, the cost is reduced, and the whole weight and thickness of product using the LCD panel is also reduced.

When the LCD panel in this embodiment is applied in the PDA mobile phone as shown in FIG. 2a and FIG. 2b, the first front polarizer 46 can be used as the first screen for mobile phone function, and the second front polarizer 47 can be used as the second screen for PDA function.

It is noted that characters, shown on the LCD panel 40 in FIG. 3d, are abnormal; that is, they are mirror images of normal characters. However, they can be changed to normal characters by means of software. Since this method is well known by persons skilled in the art, their description is omitted.

In addition, it is understood that the proportion between the first screen and the second screen of the PDA mobile phone can be changed by adjusting the size of the polarizer and the reflectors.

While the invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. A liquid crystal display panel comprising:
   a liquid crystal module having a first surface and a second surface opposite to the first surface;
   a first polarizer disposed on the whole first surface of the liquid crystal module;
   a second polarizer disposed on the whole second surface of the liquid crystal module;
   a first reflector disposed on part of the first polarizer; and
   a second reflector disposed on part of the second polarizer, wherein the other part of the second polarizer and the first reflector overlap completely in a direction perpendicular to the first surface of the liquid crystal module.

2. The liquid crystal display panel as claimed in claim 1, wherein the liquid crystal module comprises a substrate, and liquid crystal molecules.

3. A liquid crystal display panel, adapted for a PDA mobile phone having a first screen and a second screen, comprising:
   a liquid crystal module having a first surface and a second surface opposite to the first surface;
   a first polarizer disposed on the whole first surface of the liquid crystal module;
   a second polarizer disposed on the whole second surface of the liquid crystal module;
   a first reflector disposed on one portion of the first polarizer; and
   a second reflector disposed on one portion of the second polarizer, wherein the other portion of the second polarizer and the first reflector overlap completely in a direction perpendicular to the first surface of the liquid crystal module, and the other portion of the first polarizer is used as the first screen, and the other portion of the first polarizer is used as the first screen, and the other portion of the second polarizer is used as the second screen.

4. The liquid crystal display panel as claimed in claim 3, wherein the liquid crystal module comprises a substrate, and liquid crystal molecules.

* * * * *